(12) United States Patent
McCoy et al.

(10) Patent No.: US 6,983,950 B2
(45) Date of Patent: *Jan. 10, 2006

(54) QUICK CHANGE HITCH BALL ASSEMBLY

(75) Inventors: Richard W. McCoy, Granger, IN (US); Thomas W. Lindenman, South Bend, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/891,534

(22) Filed: Jul. 15, 2004

(65) Prior Publication Data

US 2004/0256837 A1   Dec. 23, 2004

Related U.S. Application Data

(63) Continuation of application No. 10/113,443, filed on Mar. 29, 2002, now Pat. No. 6,783,144.

(60) Provisional application No. 60/281,140, filed on Apr. 3, 2001.

(51) Int. Cl.
   *B60D 1/06*   (2006.01)
(52) U.S. Cl. .................................... 280/511
(58) Field of Classification Search ................ 280/511, 280/415.1, 416.1
   See application file for complete search history.

(56) References Cited

U.S. PATENT DOCUMENTS

| | | | | |
|---|---|---|---|---|
| RE19,904 E | * | 3/1936 | Donaldson | 92/173 |
| 3,269,758 A | * | 8/1966 | Ulderup et al. | 403/36 |
| 4,186,940 A | * | 2/1980 | Pillars | 280/507 |
| 4,230,336 A | * | 10/1980 | Avrea et al. | 280/507 |
| 4,433,854 A | * | 2/1984 | Smith | 280/511 |
| 4,522,421 A | * | 6/1985 | Vance | 280/511 |
| 4,889,356 A | * | 12/1989 | Morris | 280/416.1 |
| 4,938,496 A | * | 7/1990 | Thomas et al. | 280/511 |
| 5,085,452 A | * | 2/1992 | Janeiro | 280/511 |
| 5,116,072 A | * | 5/1992 | Swenson | 280/511 |
| 5,169,168 A | * | 12/1992 | Harry et al. | 280/511 |
| 5,280,941 A | * | 1/1994 | Guhlin | 280/511 |
| 5,419,576 A | * | 5/1995 | Van Vleet | 280/507 |
| 5,741,022 A | * | 4/1998 | Wass et al. | 280/507 |
| 5,871,222 A | * | 2/1999 | Webb | 280/511 |
| 6,616,168 B2 | * | 9/2003 | Belinky | 280/511 |
| 2001/0030410 A1 | * | 10/2001 | McCoige et al. | 280/511 |
| 2001/0045725 A1 | * | 11/2001 | McCoy et al. | 280/511 |
| 2002/0140207 A1 | * | 10/2002 | McCoy et al. | 280/511 |

* cited by examiner

*Primary Examiner*—Lesley D. Morris
*Assistant Examiner*—Paul Royal, Jr.
(74) *Attorney, Agent, or Firm*—McDonald Hopkins Co., LPA; Todd A. Benni

(57) ABSTRACT

A hitch ball assembly includes a towing ball having a mounting aperture and an annular race in communication with the mounting aperture. A post includes a base, an axial bore and a plurality of openings in communication with the axial bore. A ball bearing is received in each of these openings. A plunger is axially displaceable in the post between a first position allowing the towing ball to be removed from or attached to the post and a second position for securing the towing ball to the post while allowing the towing ball to turn on the post. A spring, received in the axial bore, engages an end of the plunger and biases the plunger to the first position.

20 Claims, 2 Drawing Sheets

QUICK CHANGE HITCH BALL ASSEMBLY

This application is a continuation of U.S. application Ser. No. 10/113,443 filed Mar. 29, 2002 entitled "Interchangeable Hitch Ball having Plunger with J-Shaped Channel" now U.S. Pat. No 6,783,144, which claims the benefit of Provisional Application No. 60/281,140, filed Apr. 3, 2001, which is incorporated herein by reference.

TECHNICAL FIELD

The present invention relates generally to the towing field and, more particularly, to a spring-loaded interchangeable hitch ball assembly which allows an operator to quickly and conveniently change from one size towing ball to another in order to meet the needs of any particular application.

BACKGROUND OF THE INVENTION

The use of a ball joint coupling comprising a towing ball and cooperating socket assembly in order to tow a trailer behind a towing vehicle is well known in the art. Such an arrangement provides the necessary freedom of movement to allow a trailer to track smoothly behind the towing vehicle while also providing a dependable connection.

Over the years, towing balls of various diameters have been used for this purpose and several industry standard sizes (e.g. 1⅞ inch, 2 inch, 2¼ inch and 2 5/16 inch in diameter) are now in frequent use. As a result, it is not uncommon for a single towing vehicle to be used to tow various trailers where those trailers are equipped with socket assemblies adapted for operative connection with towing balls of different diameters. Thus, a need is identified for a hitch ball assembly allowing easy and convenient interchange of towing balls of different diameters so that the hitch of the towing vehicle may be tailored to fit the socket assembly of the trailer to be towed and thereby meet application needs.

Toward this end, a number of approaches have been proposed in the past. Representative of the interchangeable hitch ball art are U.S. Pat. No. 4,433,854 to Smith, U.S. Pat. No. 5,419,576 to Van Vleet, U.S. Pat. No. 5,116,072 to Swenson and U.S. Pat. No. 4,522,421 to Vance.

The Smith '854 patent discloses a post for a towing ball incorporating a spring-biased latch pin for releasably attaching the towing ball to the base. The Van Vleet '576 patent discloses a post and towing ball secured together by means of a fastening pin. While the approaches disclosed in these patents provide secure connection of the towing ball to the post, the latch pins prevent rotation of the towing ball relative to the post. Such rotation is desirable as it minimizes binding forces and promotes articulation and smooth trailer tracking at both highway speeds and when maneuvering slowly in confined areas.

The Swenson '072 patent discloses an interchangeable hitch ball assembly including a post having an annular groove. The towing ball is secured to the post by means of an offset pin which extends tangentially through the annular groove so as to allow relative rotation of the towing ball on the post. There, however, is some difficulty in effectively securing the pin in position and the structure proposed in the Swenson patent for this purpose is relatively expensive to produce.

The Vance '421 patent discloses an interchangeable trailer ball assembly incorporating a mounting post including a threaded stem, a base, an axial bore and a pair of laterally extending bores. A tapered plunger is received in the axial bore. The plunger is biased by means of a spring into a position wherein ball bearings are forced outwardly into engagement with an annular groove or race in the towing ball thereby locking the towing ball in position on the post. An actuator rod may be extended into the axial bore to engage and lift the plunger so as to release the ball bearings from the groove or race and allow removal of the towing ball. While effective, significant user inconvenience may result as the user may need to stoop or lay on the ground in order to fish the actuator rod up through the axial bore which opens toward the ground. This can be a particularly disturbing problem if the ground is wet and/or muddy.

A need is therefore identified for an improved interchangeable hitch ball assembly.

SUMMARY OF THE INVENTION

The advantages and novel features of the invention will be set forth in part in the description that follows and in part will become apparent to those skilled in the art upon examination of the following or may be learned with the practice of the invention. The advantages of the invention may be realized and obtained by means of the instrumentalities and combinations particularly pointed out in the appended claims.

In accordance with the purpose of the present invention as described herein, an improved hitch ball assembly is provided. The hitch ball assembly may be broadly defined as including a post and a towing ball carried on the post. At least one displaceable locking element is also carried on the post in either (a) a first position free of securing engagement with the towing ball or (b) a second position in securing engagement with the towing ball. Further, the assembly includes a plunger carried on the post. The plunger includes at least one channel for engaging and receiving the at least one displaceable element.

Still more specifically defining the invention, the hitch ball assembly may include a towing ball having a mounting aperture and an annular race in communication with the mounting aperture. The assembly also includes a post having a base, an axial bore and at least one opening in communication with the axial bore. In a typical arrangement, two opposed openings are provided.

The hitch ball assembly further includes a ball bearing received in each of the openings. Further, a plunger is provided including at least one J-shaped channel. The plunger is carried in the axial bore of the post. Additionally, the hitch ball assembly includes a spring received in the axial bore and engaging an end of the plunger. The spring functions to bias the plunger into a first position.

More specifically describing the invention, the plunger includes a J-shaped channel for receiving each ball bearing. Each J-shaped channel includes a cavity at a first end. When the plunger is biased by the spring into the first position, the ball bearings are aligned with and received in the cavities. In this position the ball bearings are received more fully within the post and therefore are free of securing engagement with the towing ball. Thus, the towing ball may be removed from or installed on the post in this position of the plunger.

In accordance with additional and more specific aspects of the present invention, the post further includes a threaded mounting stem depending from the base. It is this mounting stem that allows the post to be secured to a hitch bar, tow bar, ball mount head or the like. Additionally, the post is tapered to aid in the securing and removing of the hitch ball on the post.

Still further, the towing ball includes a circular opening in communication with the mounting aperture and the plunger includes a slotted head. With the hitch ball mounted on the post, the slotted head extends through the circular opening so as to be engageable by a tool which may be manipulated to rotate and thereby displace the plunger between the first position, allowing installation or removal of the towing ball, and a second position wherein the plunger forces the ball bearings to project further from the post and engage the annular race in the towing ball. This functions to secure the towing ball to the post while allowing the towing ball to rotate freely on the post. It should also be appreciated that the edges of the post defining the openings around the ball bearings are staked so as to prevent the ball bearings from falling out of the post when the towing ball is removed.

Still other features of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings:

FIG. 4 is a detailed perspective view of the plunger, clearly illustrating one of the J-shaped channels.

Figure 1:
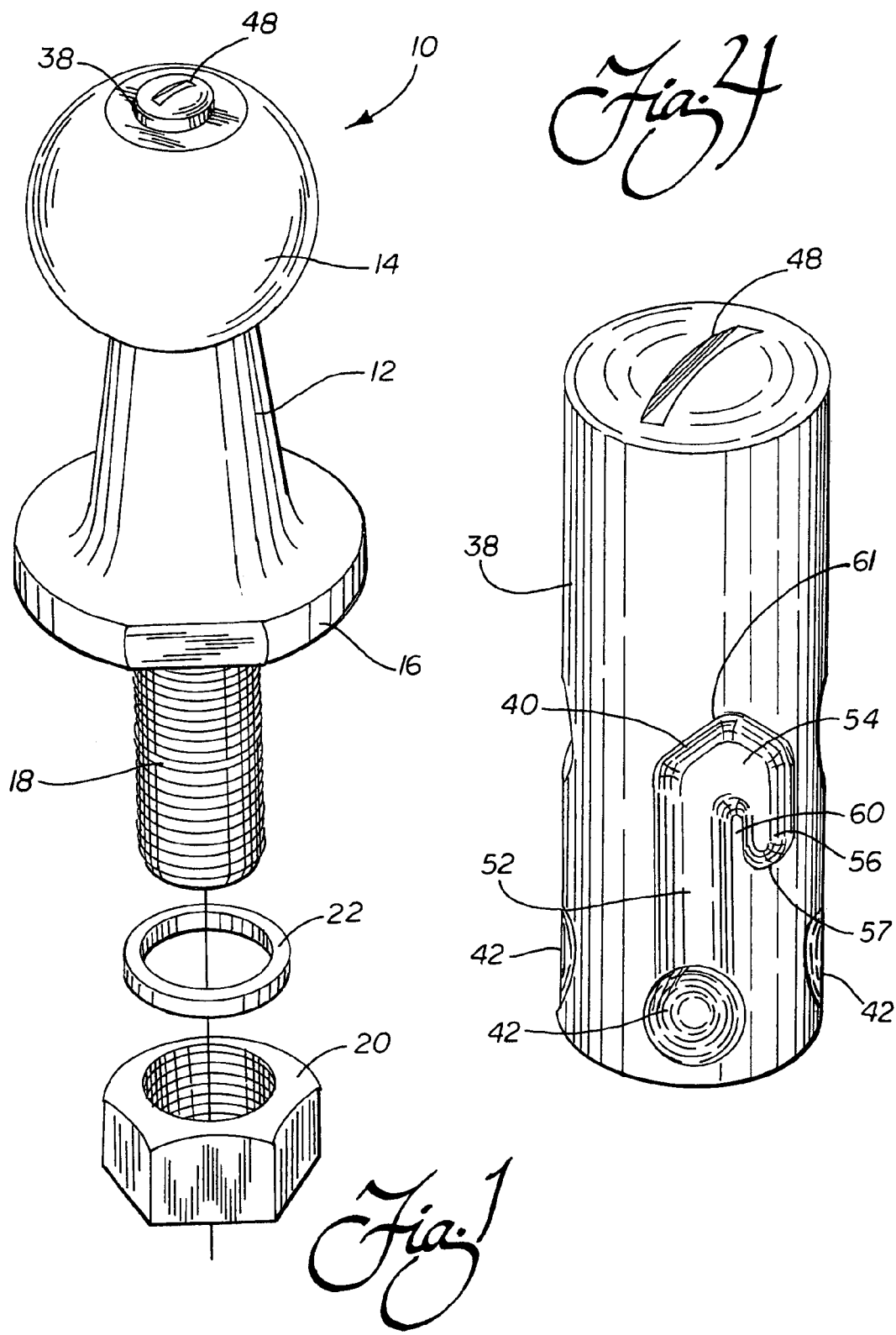
FIG. 1 is a partially exploded, perspective view of the present invention.

Reference will now be made in detail to the present preferred embodiment of the invention, an example of which is illustrated in the accompanying drawings.

DETAILED DESCRIPTION OF THE INVENTION

Reference is now made to FIGS. 1–4 showing the hitch ball assembly 10 of the present invention. The assembly 10 includes a post generally designated by reference numeral 12 and a towing ball 14. As shown, the post 12 includes a base 16. A threaded stem 18 depends from the base. The post 12 is mounted to a hitch bar or draw bar by extending the threaded stem 18 through an aperture in the hitch bar so that the base 16 rests flat on the hitch bar. A cooperating nut 20 and lock washer 22 are then engaged over the threaded stem 18. The nut 20 is tightened to provide a secure connection. Of course, a locknut could be utilized in place of the cooperating nut 20 and lock washer 22.

Figures 2, 3:
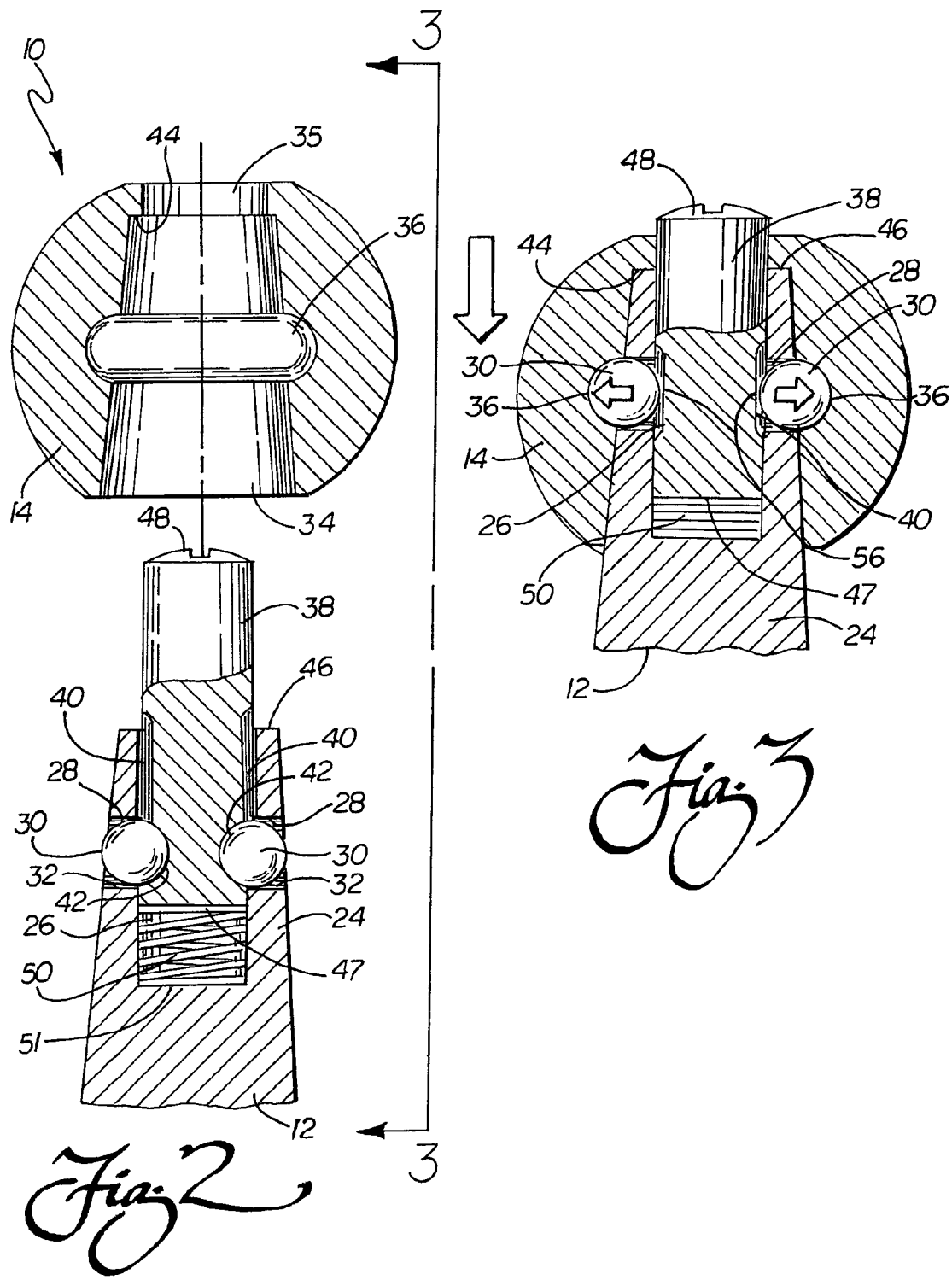
FIG. 2 is a detailed cross sectional partially exploded view showing the present invention in the first operative position with the towing ball removed from the post and the ball bearings received in the cavities of the plunger.
FIG. 3 is a detailed cross sectional view showing the present invention in the second operative position with the towing ball securely held on the post by engagement of the ball bearings held in the post projecting into the annular race in the towing ball.

As best shown in FIGS. 2 and 3, the post 12 includes a tapered upper portion 24 which has an axial bore 26. A plurality of openings 28 extend through the wall of the tapered upper portion 24 and communicate with the axial bore 26. While two opposed openings 28 are illustrated in FIGS. 2 and 3, it should be appreciated that less or more could be provided in the same plane radially around the circumference of the tapered upper portion 24. A displaceable locking element such as a ball bearing 30 is provided in each of the openings 28. Preferably, the edges 32 of the outer wall of the tapered upper portion 24 defining the openings 28 are staked so as to retain the ball bearings 30 in the openings.

The towing ball 14 includes (a) a mounting aperture 34 tapered to match the upper post portion 24; (b) a circular opening 35 extending through the top of the ball in communication with the mounting aperture; and (c) an internal, annular race 36 extending continuously around and in communication with the mounting aperture 34. The annular race 36 is sized and shaped to receive the ball bearings in the manner shown in FIG. 3.

A plunger 38 is held in the axial bore 26. As best shown in FIG. 4, the plunger 38 includes one or more J-shaped channels 40 with one J-shaped channel being provided for each one of the ball bearings 30. As shown, each J-shaped channel 40 includes a ball bearing receiving cavity 42 at a first end thereof. The plunger 38 also includes a slotted head 48. As illustrated, the ball bearing receiving cavity 42 is at the end of the plunger 38 opposite the slotted head 48.

As best illustrated in FIGS. 2 and 3, a compression spring 50 is positioned in the axial bore 26 of the post 12. One end of the compression spring 50 engages the bottom wall 51 of the axial bore 26 while the other end engages the bottom wall 47 of the plunger 38. As a consequence, the compression spring 50 functions to bias the plunger 38 into a first position shown in FIG. 2. In that first position, the ball bearing receiving cavities 42 at the ends of the J-shaped channels 40 in the plunger 38 are aligned with and receive the ball bearings 30. The ball bearing receiving cavities 42 are of sufficient depth to receive the greater portion of the ball bearings 30. As a consequence, the ball bearings 30 have sufficient clearance to retract fully within the outer sidewall margin of the tapered upper portion 24 of the post 12. In this retracted position the ball bearings 30 do not interfere with the installation or removal of a towing ball 14 on the post 12. Of course, the tapering of the upper post portion 24 aids in the free removal and seating of the towing ball 14 on the post 12 when changing towing balls.

When the towing ball 14 is fully seated on the post 12 as shown in FIG. 3, the plunger 38 extends through the opening 35 and an annular shoulder 44 at the end of the mounting aperture 34 engages the upper edge 46 of the post 12. In the seated position, the annular race 36 in the towing ball 14 is aligned in the same plane with the openings 28 and ball bearings 30. In this position, the plunger 38 may be manipulated to secure the towing ball 14 in position. More specifically, a screwdriver or other tool may be used to engage the slotted head 48 of the plunger 38. The plunger 38 is then depressed downwardly into the axial bore 26 of the post 12 against the biasing force of the compression spring 50. As the plunger 38 is depressed, the ball bearings 30 are forced from the ball bearing receiving cavities 42 into the first leg 52 of each J-shaped channel 40 in the plunger 38. Each of the first legs 52 is of shallower depth than the ball bearing receiving cavities 42 and, accordingly, the plunger 38 effectively forces the ball bearings 30 to project outwardly through the openings 28 beyond the sidewall of the tapered upper post portion 24. As a result, a portion of the ball bearings 30 are received in the annular race 36 which extends continuously around the inner wall of the towing ball 14.

Once the plunger 38 has been depressed sufficiently to bring the ball bearings into the bend 54 of each of the J-shaped channels 40, the plunger is rotated slightly in a clockwise direction. In this manner the ball bearings 30 move through the bend 54 into the second leg 56 of the J-shaped channels 40. The plunger 38 is then released and the compression spring 50 biases the plunger so that the ball bearings 30 each rest at the bottom 57 of the second leg 56 as best shown in detail in FIG. 3. The intermediate wall 60 between the first and second legs 52,56 around which the bend 54 is formed functions to hold the ball bearings 30 in the second leg 56 and prevents their free movement into the first leg 52 leading to the ball bearing receiving cavities 42. Thus, in this second position shown in FIG. 3, it should be appreciated that the towing ball 14 is securely held on the post 12 by the engagement of the projecting ball bearings 30 in the annular race 36 of the towing ball.

Simultaneously, the ball bearings 30 are able to move freely through the annular race 36 and as a result, this structure allows relative rotation of the towing ball 14 on the post 12. This rotation helps ensure binding free towing and smooth trailer tracking under substantially any foreseeable operating conditions. This relative rotation prevents the ball 14 from freezing in place and reduces the wear on the ball and the trailer socket assembly.

If the operator needs to change the towing ball 14 for any reason, this maybe conveniently and easily accomplished in a quick and efficient manner. First, the plunger 38 is depressed slightly so that the ball bearings 30 are brought into the upper portion of the second leg 56 of the J-shaped channel 40 which communicates with the bend 54. The plunger 38 is then rotated slightly counterclockwise by engagement of an appropriate tool in the slotted head 48. This causes the ball bearings 30 to move through the bend 54 over the intermediate wall 60, bringing them into alignment with the upper portion of the first leg 52 of the J-shaped channel 40. It should be appreciated that the V-shape of the wall 61 of the channel 40 opposite the wall 60 prevents the ball from hanging up in any way along the top of the wall 60. The plunger 38 is then released and the compression spring 50 biases the plunger upwardly giving a clear visual indication of the unlocked condition of the plunger.

As the plunger 38 rises upwardly from the post 12 out of the axial bore 26, the ball bearings 30 pass along the first leg 52 and are then received in the ball bearing receiving cavities 42. As noted above, these ball bearing receiving cavities 42 are of sufficient depth to receive the greater portion of the ball bearings 30. In this position, as the towing ball 14 is lifted from the post 12, the ball bearings 30 retract within the openings 28 in the upper post portion 24 until the ball bearings are free of the annular race 36. The towing ball 14 may then be easily removed from the post 12. The operator then selects a new towing ball 14 for installation on the post 12 and that installation is completed in the manner already described.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A hitch ball assembly, comprising:
   a post;
   a towing ball carried on said post and having a top opening;
   at least one locking element carried on said post and displaceable between a first position free of securing engagement with said towing ball and a second position securing the towing ball to the post; and
   a plunger carried on said post and extending at least partially through the opening in the towing ball, said plunger including at least one channel for receiving the displaceable locking element in the second position.

2. The assembly of claim 1, wherein the channel includes a cavity for receiving the locking element in the first position.

3. The assembly of claim 2, wherein the channel is J-shaped.

4. The assembly of claim 3, wherein the cavity is at one end of the J-shaped channel.

5. The assembly of claim 1, wherein the channel receives the locking element in both the first and second positions.

6. The assembly of claim 1, wherein said at least one locking element is a ball bearing.

7. The assembly of claim 1, further including a biaser carried on the post and engaging an end of the plunger.

8. The assembly of claim 1, further including a spring carried on the post and engaging an end of the plunger.

9. The assembly of claim 1, wherein the plunger includes a slotted head extending through the opening and engageable by a tool in order to rotate and thereby move the plunger to displace the locking element between the first and second positions.

10. The assembly of claim 1, wherein the post is tapered.

11. A hitch ball assembly, comprising:
    a post;
    a towing ball carried on the post;
    at least one locking element carried on the post and displaceable between a first position free of securing engagement with the towing ball and a second position securing the towing ball to the post;
    a plunger carried on the post, the plunger including at least one cavity for receiving the at least one locking element;
    a biaser carried on the post and engaging an end of the plunger, the biaser being relaxed when the locking element is in the first position.

12. The assembly of claim 11, wherein the biaser is a compression spring.

13. The assembly of claim 11, wherein the cavity is part of a channel.

14. The assembly of claim 13, wherein the channel is J-shaped.

15. The assembly of claim 13, wherein the channel receives the at least one locking element in both the first and second positions.

16. The assembly of claim 11, wherein the plunger includes a slotted head extending through the opening and engageable by a tool in order to rotate and thereby move the plunger to displace the locking element between the first and second positions.

17. The assembly of claim 11, wherein the post is tapered.

18. A hitch ball assembly, comprising:

a post;

a towing ball carried on the post and having an opening;

at least one locking element carried on the post and displaceable between a first position free of securing engagement with the towing ball and a second position securing the towing ball to the post;

a plunger carried on the post and extending at least partially through the opening in the towing ball, the plunger receiving the at least one locking element in both the first and second positions; and a biaser carried on the post and engaging an end of the plunger, the biaser being compressed by the plunger when the locking element is in the second position.

19. The assembly of claim 18, wherein the biaser is a compression spring.

20. The assembly of claim 18, wherein the plunger includes a slotted head extending through the opening in the towing ball and engageable by a tool in order to rotate and thereby move the plunger to displace the locking element between the first and second positions.

* * * * *